Oct. 13, 1931.  A. C. MacGUIRE  1,827,595
DOORCHECK
Filed Aug. 25, 1930
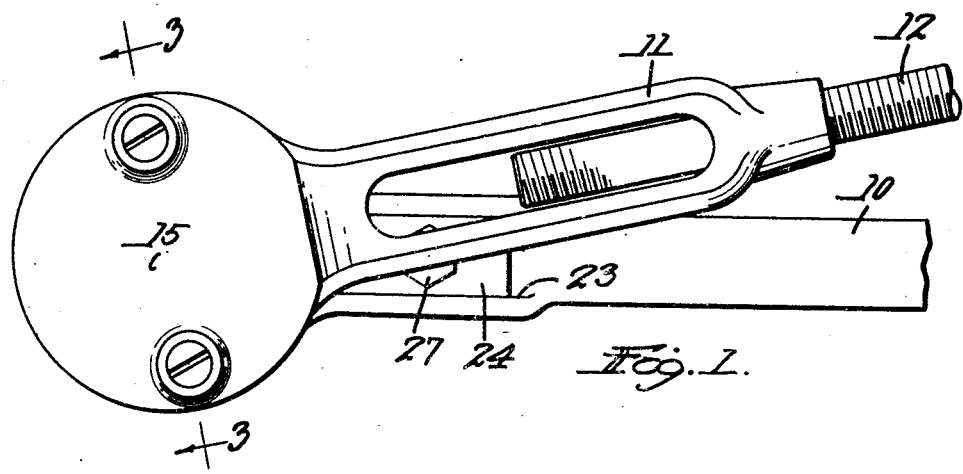
Fig. 1.
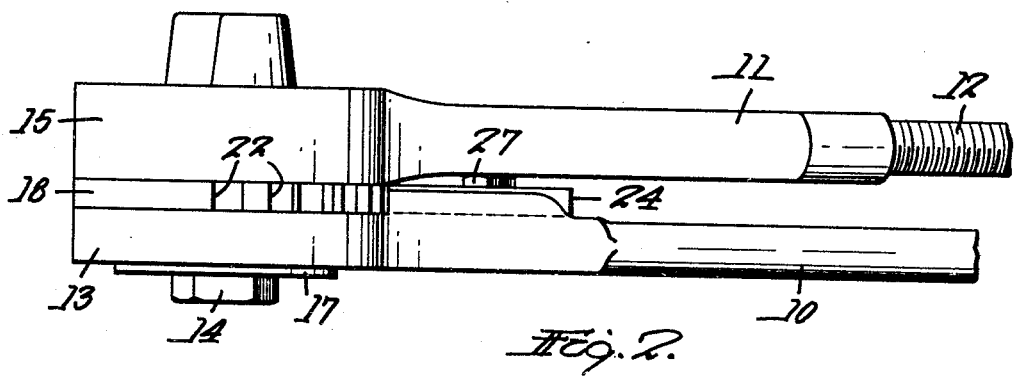
Fig. 2.
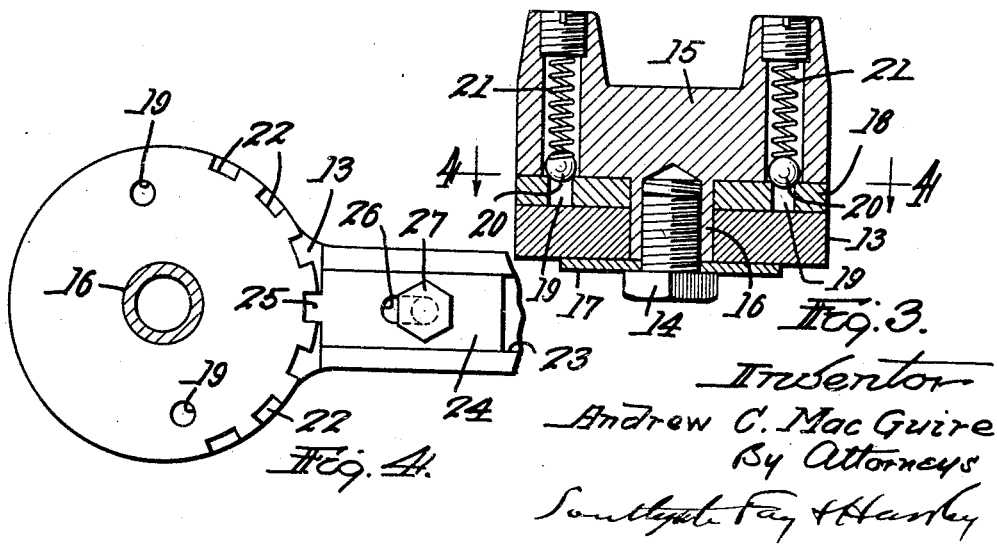
Fig. 3.
Fig. 4.
Inventor
Andrew C. MacGuire
By Attorneys
Southgate Fay & Hanley Patented Oct. 13, 1931

1,827,595

UNITED STATES PATENT OFFICE

ANDREW C. MacGUIRE, OF FITCHBURG, MASSACHUSETTS, ASSIGNOR TO INDEPENDENT LOCK COMPANY, OF FITCHBURG, MASSACHUSETTS, A CORPORATION OF MASSACHUSETTS

DOORCHECK

Application filed August 25, 1930. Serial No. 477,532.

This invention relates to the operating arms of a door check.

The principal objects of the invention are to provide an easily adjustable means by which the door can be arranged to be held by the door check in different positions, that is, at different angles, and also to provide this means in such form that the parts will be easily manufactured and there will be no serious problems of assembling and no material added cost.

Other objects and advantages of the invention will appear hereinafter.

Reference is to be had to the accompanying drawings, in which

Fig. 1 is a plan of the two pivotally connected arms of a door check showing a preferred embodiment of this invention;

Fig. 2 is an edge view;

Fig. 3 is a sectional view on the line 3—3 of Fig. 1, and

Fig. 4 is a sectional view on the line 4—4 of Fig. 3 showing the adjusting disc in plan.

I have not shown the door check itself as this invention relates only to the arms with which it is provided. The arm 10 is connected with the door check to be operated thereby and the arm 11 is connected by its adjusting screw 12 with a cleat to be attached to the door. The arm 10 is provided with a circular head 13 provided with a perforation through the center for a bolt 14 which screws into a head 15 fixed to the arm 11. This head 15 is provided with an integral sleeve 16 into which this bolt screws and a washer 17 is shown under the head of the bolt.

Between the two heads 13 and 15 is an adjusting disc 18. This disc is provided with two perforations or seats 19 for the reception of two spring-pressed balls 20 carried by the head 15 and provided with springs 21 for frictionally holding them in these seats when the heads are turned into the proper position. The two seats and heads are arranged as shown opposite each other.

The disc 18 is not held in any position when the bolt 14 is loosened but is capable of turning on the sleeve 16 on which it is centered. It is provided with a series of notches 22 in its edge and the handle 10 is provided with a guideway 23 and with a slide 24 mounted therein. This slide has a tooth 25 adapted to enter any one of the notches 22 to hold the disc 18 in any desired position. The slide is provided with a slot 26 and a bolt 27 passes through this slot and into the handle 10 to hold the slide in the position shown in Fig. 4.

In the operation of the device, the bolts 14 and 27 are loosened and the slide 24 pulled back and then the disc 18 can be turned to the desired position, thus changing the position of the seats 19. Then the slide is moved back into the nearest notch 22 and bolts fastened. The fastening of the bolts of course does not prevent the turning of the two arms 10 and 11 with respect to each other. They can be turned to a position in which the balls 20 register with the seats 19 and they will be held in that position by the spring pressure on the balls against any ordinary force such as that of the wind. They are held only by friction and can be moved if enough force is applied. This provides a convenient way in which the door check can be set so the door can be opened to any desired angle and will normally retain that position without providing any means for engaging the floor.

Although I have illustrated and described one form of the invention, I am aware of the fact that modifications can be made therein by any preson skilled in the art without departing from the scope of the invention as expressed in the claims. Therefore I do not wish to be limited in this respect, but what I do claim is:—

1. The combination with a pair of arms pivoted together, of a disc mounted between them in frictional engagement with both arms and having a seat, a spring-pressed holding device carried by one arm and adapted to engage in said seat, and means carried by the other arm for holding said disc in different angular positions, whereby the arms will be held at a desired angle from each other.

2. The combination with a pair of arms pivotally connected together and a disc pivoted on the same axis and located between them in frictional contact with them, said disc having a pair of seats and a series of notches on the edge, means on one of said arms engaging one of said notches for fixing the position of said disc and a pair of holding devices carried by the other arm and located in position to engage said seats and hold the other arm at the desired angle from the first arm.

3. The combination with a pair of arms pivotally connected together and a disc pivoted on the same axis and located between them in frictional contact with both, said disc having a pair of opposite seats on one surface and a series of notches on the edge, a tooth movable on one of said arms into and out of the notches, means for holding the tooth projecting into one of said notches to fix the adjustment of said disc and a pair of opposite spring-pressed balls carried by the other arm for engaging said seats and frictionally holding the other arm at the desired angle from the first arm.

4. The combination with a pair of arms pivotally connected together and a disc pivoted on the same axis and located between them in frictional contact with them, said disc having a seat mounted at a distance from the center of the disc and a series of notches, means on one of said arms engaging one of said notches for fixing the position of said disc and a holding device carried by the other arm and located in position to engage said seat and hold the other arm at the desired angle from the first arm.

In testimony whereof I have hereunto affixed my signature.

ANDREW C. MacGUIRE.